Dec. 7, 1965   C. VAN DER LELY   3,221,484
CROP-WORKING IMPLEMENTS
Filed Nov. 27, 1962   9 Sheets-Sheet 1

INVENTOR.
CORNELIS VAN DER LELY
BY
Mason, Mason & Albright
Attorneys

Dec. 7, 1965  C. VAN DER LELY  3,221,484
CROP-WORKING IMPLEMENTS
Filed Nov. 27, 1962  9 Sheets-Sheet 2

INVENTOR.
CORNELIS VAN DER LELY
BY
Mason, Mason & Albright
Attorneys

INVENTOR.
CORNELIS VAN DER LELY

3,221,484
CROP-WORKING IMPLEMENTS
Cornelis van der Lely, Zug, Switzerland, assignor to C. van der Lely N.V., Weverskade, Maasland, Netherlands, a Dutch limited-liability company
Filed Nov. 27, 1962, Ser. No. 240,305
Claims priority, application Netherlands, Dec. 1, 1961, 272,073; Aug. 15, 1962, 282,138
16 Claims. (Cl. 56—370)

This invention relates to crop-working implements, such as tedders, of the kind comprising a frame movable over the ground in which frame a tined crop-working member is journalled so as to be rotatable about a substantially horizontal axis.

An object of the invention is the provision of an effective and versatile implement which can deal readily with large accumulations of crop such as relatively high windrows.

According to the invention, there is provided an implement of the kind set forth, wherein a guide member is provided which projects forwardly of the implement during the use thereof and which extends across a part of the width of the crop-working member.

This invention relates further to crop-working implements of the kind comprising a frame movable over the ground and a crop-working member journalled in the frame so as to be rotatable about a substantially horizontal axis.

An object of the invention is the provision of an implement which can be used to form worked crop into a single relatively large swath.

According to the invention, there is provided an implement of the kind set forth, wherein a guide member is provided for displaced crop which guide member extends obliquely rearwardly, relative to the intended direction of travel, from one side of the implement, the guide member being constructed and arranged in such a way that, in the use of the implement, crop worked thereby can be deposited on a strip of land whose width is substantially less than the width of the crop-working member and which is located towards the side of the implement remote from the side to which the guide member is connected.

For a better understanding of the invention, and to show how the same may be carried into effect, reference will now be made, by way of example, to the accompanying drawings, in which.

Figure 1:
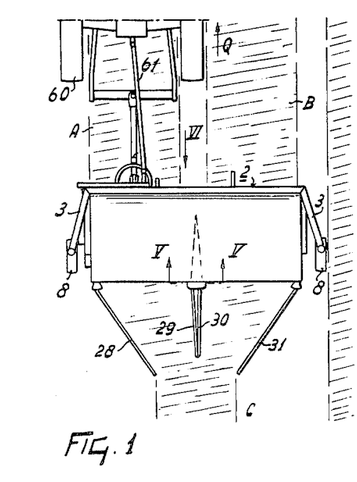
FIGURE 1 is a plan view of a tedder in accordance with the invention coupled to the rear of a tractor.

The tedder has two main frame beams 2, 202 which are arranged one above the other and which both extend parallel to the axis of rotation of a tined body or drum 1 which is rotatably journalled in the frame of the tedder. The upper frame beam 2 is provided at its opposite ends with two frame beams 3 which are contained in a horizontal plane and which project rearwardly of the frame beam 2 at an angle of other than 90° thereto. The lower frame beam 202 has two frame beams 4 connected to its opposite ends, the frame beams 4 being located, in plan view, beneath the frame beams 3 but, in side elevation (FIGURE 2), extending obliquely upwardly and rearwardly of the lower frame beam 202.

Figure 2:
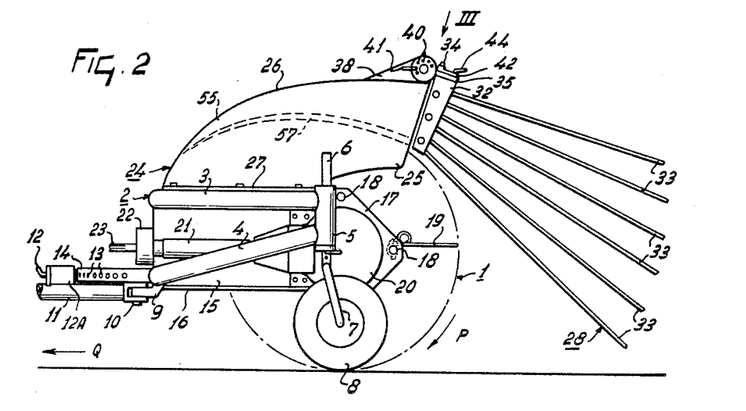
FIGURE 2 is a side elevation, to an enlarged scale, of the tedder of FIGURE 1.

The ends of the beams 3 and 4 remote from the beams 2, 202 are secured to vertical bearings 5 in which vertical shafts 6 are rotatably journalled. The shafts 6 are connected by inclined arms 7 to horizontal axles upon which ground wheels 8 are rotatably mounted. The ground wheels 8 are castor wheels and means (not shown) is preferably provided to enable the levels of their axles to be adjusted relative to that of the frame. It will be apparent that such adjustment will change the level of the frame relative to the surface of the ground. Further means which is not illustrated in detail in the drawings is also provided whereby the plane of rotation of at least one of the ground wheels 8 can be retained in chosen angular settings about the longitudinal axis of the corresponding vertical shaft 6. This allows the disposition of the tedder to be fixed relative to the direction of travel thereof.

A vertical pivot pin 10 is connected to the lower frame beam 202 by means of a support 9 and one end of a draw-bar 11 is turnable about the pin 10. An approximately semi-cylindrical strip 14 whose center of curvature coincides with the longitudinal axis of the pivot pin 10 has its opposite ends secured to the lower frame beam 202. A bracket 12A is carried by the upper side of the draw-bar 11 and supports a horizontal locking pin 12 whose tip can enter any one of a number of holes 13 formed in the strip 14. It will be apparent that the hole 13 which is selected to co-operate with the locking pin 12 will determine the angular setting of the draw-bar 11 about the pivot pin 10.

Two vertical plates 15 extending perpendicular to the frame beams 2, 202 are mounted adjacent the opposite ends of those frame beams, the upper and lowermost edges 16 of the plates 15 being bent over so as to project horizontally. The plates 15 carry aligned horizontal bearings (not shown) which define an axis of rotation afforded by a central shaft (not shown) of the tined body or drum 1, the said shaft being parallel to the two main frame beams 2, 202. The drum 1 includes a number of approximately square plates 17 arranged at right-angles to the axis of rotation, these plates carrying four tine supports 18 which extend parallel to the axis of rotation and to each of which a plurality of tines 19 is secured. A gear casing 20 is secured to the side of one of the plate 15 remote from the tined body or drum 1 and contains a bevel gear rigidly secured to the corresponding end of the central shaft of the tined body or drum. The gear casing 20 also accommodates a second bevel gear whose teeth are in mesh with those of the gear just mentioned and which is rigidly secured to one end of a shaft (not visible) which extends forwardly of the tedder at right-angles to the axis of rotation of the body or drum 1. The said shaft is disposed within a protective cylindrical sleeve or casing 21 whose front end opens into a further casing 22. The leading end of the said shaft carries a sprocket disposed within the casing 22 which sprocket is connected by an endless chain to a further sprocket carried by a shaft 23 whose leading splined end projects forwardly of the casing 22.

The tedder has a baffle or hood which is generally indicated by the reference numeral 24 and which comprises two opposite side or end plates 25 extending perpendicular to the axis of rotation of the body or drum 1 and a curved plate 26 which is bent so as to surround part of the body or drum 1. The lowermost leading edge of the plate 26 is located at the level of the lower frame beam 202. The lowermost edges 27 of the side or end plates 25 are bent over horizontally and rest upon the uppermost edges 16 of the two plates 15. Bolts are employed to fasten the edges 27 and 16 to one another.

Figure 3:
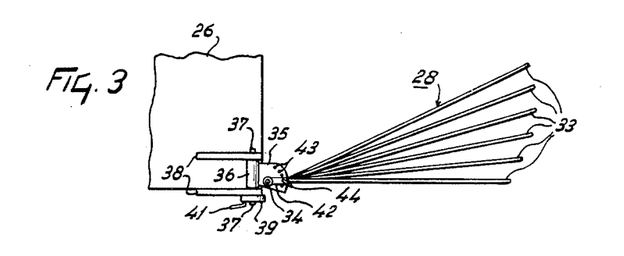
FIGURE 3 is a view as seen in the direction indicated by the arrow III of FIGURE 2.
Figure 4:
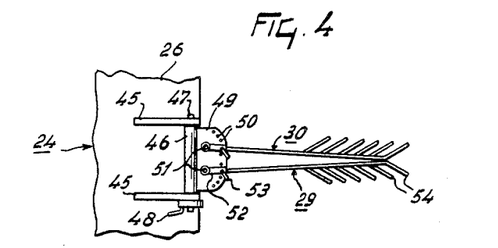
FIGURE 4 is a view similar to FIGURE 3 but showing further parts of the implement in greater detail.

As can be seen in FIGURE 1, four guide members 28, 29, 30 and 31 are connected to the rearmost edge of the baffle 24, the guide members 28 and 31 being arranged at the opposite sides or ends of the said baffle while the two guide members 29 and 30 are located centrally thereof. Referring to FIGURES 2 to 4, it can be seen that the guide member 28, which is symmetrically identical with the guide member 31, includes a support 32 to which six spring steel guide rods 33 are secured. In side elevation (FIGURE 2), the guide rods 33 are located one above the other, the inclinations of the rods to the horizontal progressively increasing from the uppermost rod to the lowermost rod. However, in plan view (FIGURE 3), the rods are inclined at different angles to a plane extending perpendicular to the axis of rotation of the body or drum 1. The inclinations of the rods to said plane progressively increase from the uppermost rod to the lowermost rod. The support 32 is connected with a pivot pin 34 which is located in a vertical plane and which is journalled in a sector plate 35 carried by a tube 36 whose opposite ends have horizontally aligned stub shafts or gudgeons 37.

The guide member 28 with its support 32 can be turned about the longitudinal axis of the pivot pin 34 and can be retained in any one of a number of different angular settings about the said axis by entering a locking pin 44 through a hole in an arm 42 rigid with the pivot pin 34 and through a chosen one of a number of holes 43 formed in the sector plate 35 at equal distances from the pivot pin 34. The guide member 28 can also be turned about the horizontal axis afforded by the stub shafts or gudgeons 37, this axis extending parallel to the axis of rotation of the body or drum 1. The stub shafts or gudgeons 37 are journalled in two lugs 38 secured to the plate 26. One of the stub shafts or gudgeons 37 carries a ring 39 formed with a number of holes 40. A single registering hole is formed in the adjoining lug 38 and a locking pin 41 can be entered through a chosen hole 40 and the hole in the lug 38 to retain the tube 36, and thus the guide member 28, in a corresponding angular setting about the axis afforded by the stub shafts or gudgeons 37.

As can be seen in FIGURE 4, two lugs 45 are secured to the plate 26 adjacent the center thereof. Stub shafts or gudgeons 47 arranged at the opposite ends of a tube 46 are journalled in these lugs in such a way that the tube 46 is turnable about an axis extending parallel to the axis of rotation of the body or drum 1. A chosen angular setting of the tube 46 about said axis can be maintained with the aid of a locking pin 48 in substantially the same manner as has just been described in connection with the tube 36. A double sector plate 49 projects rearwardly of the tube 46 and is formed with two rows of holes 50. Two pivot pins 51 contained in vertical planes are journalled in the double sector plate 49 and carry supports, generally similar to the support 32, to which the guide members 29 and 30 are respectively connected. Each of the guide members 29 and 30 can be retained in a chosen angular setting about the longitudinal axis of the corresponding pivot pin 51 by entering a locking pin 53 through a hole in an arm 52 rigidly secured to the said pivot pin and through a selected one of the holes 50.

The guide members 29 and 30 are similar to the guide members 28 and 31 in consisting principally of a number of spring steel guide rods. In side elevation (not illustrated), the guide rods of the guide members 29 and 30 are disposed in a similar manner to the guide rods 33 (FIGURE 2) of the guide member 28. However, in plan view (FIGURE 4), the guide rods are located, in the position in which they extend substantially perpendicular to the axis of rotation of the body or drum 1, vertically above one another throughout the greater parts of their lengths, only the free ends 54 thereof being bent over towards the guide member 28 in the case of the guide member 29 and towards the guide member 30. As can be seen in FIGURE 4, the guide members 29 and 30 can be retained in positions in which they are in very close proximity to, or actual contact with, one another.

Figure 5:
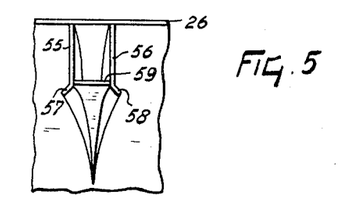
FIGURE 5 is a view, to an enlarged scale, as seen in the direction indicated by the arrows V—V of FIGURE 1.
Figures 7, 8:
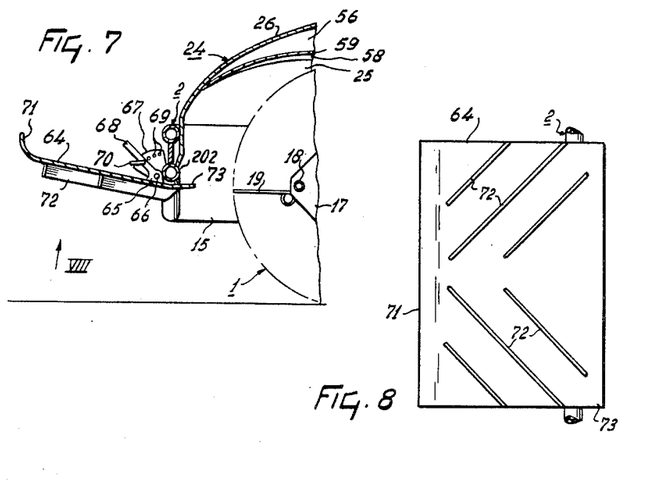
FIGURE 7 is a sectional elevation of part of the tedder of FIGURE 1 showing the provision of a guide member.
FIGURE 8 illustrates the guide member of FIGURE 7 as seen in the direction indicated by the arrow VIII of that FIGURE.

The concave side of the plate 26 facing the body or drum 1 is provided with two plates 55 and 56 (FIGURE 5) which project substantially at right-angles to the plate 26. The lowermost edges 57 and 58, respectively, of the plates 55 and 56 are bent over from the center of the plate 26 towards the opposite ends thereof. The roots of the two edges 57 and 58 are, in addition, joined to one another by a strengthening plate 59 which closes all but the rearmost end of the space between the plates 55 and 56. The rearmost ends of the two plates 55 and 56 are spaced apart from one another by a distance which is such that the supports (not shown) of the two guide members 29 and 30 are located between them when considered in a direction perpendicular to the axis of rotation of the tined body or drum 1. Moreover, in side elevation, the rearmost ends of the edges 57 and 58 are located at about the same height as the lowermost ends of the supports which have just been mentioned. As can be seen in FIGURES 2, 5 and 7, the plates 55 and 56 progressively decrease in height towards the front of the tedder and also converge towards one another so that they eventually merge into the plate 26 at a single point.

The leading end of the draw-bar 11 can be employed to connect the tedder to the tow-bar of a tractor such as the tractor 60 which is illustrated in FIGURE 1. The shaft 23 is placed in driven connection with the power take-off shaft of the tractor 60 by means of a telescopic transmission shaft 61 having universal joints at its opposite ends. The tedder can thus be moved over the ground in the direction indicated by the arrow Q (FIGURES 1 and 2) while the tined body or drum 1 is rotated in the direction indicated by the arrow P (FIGURE 2). The casing 22 may be provided with an additional shaft 23A (FIGURE 9) which is so arranged that, when the transmission shaft 61 is connected thereto, the tined body or drum 1 will be rotated in a direction opposite to the direction P with a constant direction of rotation of the power take-off shaft of the tractor 60.

Figure 6:
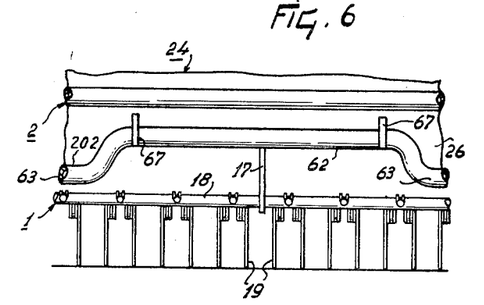
FIGURE 6 is a view, to an enlarged scale, as seen in the direction indicated by the arrow VI of FIGURE 1.

In order that large swaths of cut crop may pass beneath the frame of the tedder without fouling the same, a central region 62 (FIGURE 6) of the lowermost frame beam 202 is offset upwardly relative to opposite end portions 63 of the same frame beam. The lowermost leading edge of the plate 26 of the baffle 24 is shaped to match the configuration of the lowermost frame beam 202. It is preferred that the central region 62 should have a width equal to about one-third of the width of the tined body or drum 1.

FIGURES 7 and 8 show the provision of a guide member which is afforded by a plate 64 arranged at the front of the tedder. The upper side of the plate 64 is provided with lugs 65 in which a horizontal shaft 66 extending parallel to the axis of rotation of the body or drum 1 is journalled. The shaft 66 is also journalled in two sector plates 67 carried by the central portion 62 of the lowermost frame beam 202. One of the two lugs 65 is extended to form a handle 68 in which a single hole is formed that can be brought into register with any one of a number of holes 69 formed in an adjacent one of the two sector plates 67. Upon entering a horizontal locking pin 70 through the registering holes, the plate 64 will be retained in an angular setting about the shaft 66 corresponding to the particular hole 69 which has been chosen. The leading edge 71 of the plate 64 is curved upwardly while a series of ribs 72 is provided on the lowermost side of the plate. The ribs 72 are arranged in two series which are oppositely inclined at angles of other than 90° to the axis of rotation of the tined body or drum 1, there being a space between the two series in which the lower side of the plate 64 carries no projecting members.

It will be apparent that during use of the tedder, the plate 64 limits the height of the cut crop which is supplied to the tined body or drum 1. The plate 64 will be moved to different angular settings about the shaft 66 in accordance with the original height of the cut crop which is to be worked so that the whole of a swath may be effectively guided into contact with the body or drum 1. The ribs 72 act to distribute crop passing beneath the plate 64 towards the opposite sides or ends of the body or drum 1 so that the said crop is more or less uniformly distributed throughout the width of the body or drum. During use of the tedder, the plate 64 is preferably positioned in such a way that a line of intersection between its own plane and a vertical plane extending perpendicular to the axis of rotation of the body or drum 1 makes an angle of not more than 45° with the horizontal. The width of the plate 64 in a direction parallel to the axis of rotation of the body or drum 1 is preferably in excess of one-sixth of the width of the body or drum and, in the embodiment illustrated, the width of the said plate is equal to approximately one-third of the width of the body or drum 1. The rearmost edge 73 of the plate 64 projects rearwardly of the lowermost edge of the plate 26 and is located at a level slightly below the level of the axis of rotation of the body or drum 1.

It will be apparent that, if desired, the plate 64 may be rigidly secured to the frame of the tedder instead of pivotable relative thereto as illustrated. As a further alternative, the plate 64 may be mounted so as to be slidable to different positions relative to the frame. When the plate 64 is not required in the embodiment which is illustrated in the drawings, it may be turned about the shaft 66 until it is substantially vertically disposed, the locking pin 70 being employed to maintain this position. The edge 73 thereof will then itself be substantially vertically disposed and will occupy a position such that it constitutes an extension of the plate 26 in the region thereof which is foreshortened to match the central region 62 of the lowermost frame beam 202. Although the implement which has been described in detail takes the form of a tedder, it will be apparent that a number of the features of the invention could equally well be applied to other implements for working crops.

It will be apparent from FIGURE 2 that, during operation of the tedder, crop engaged by the tines 19 is moved upwardly in front of the body or drum 1 and then rearwardly over the top thereof beneath the baffle 24 from the rearmost end of which it is ejected so as to fall to the ground to the rear of the tedder. The tedder may be employed in several different ways. For example, in FIGURE 1, the tedder is shown working two relatively spaced swaths of mown crop. The guide members 28 and 31 are arranged so that the displaced crop is deflected towards the center of the tedder whereas the guide members 29 and 30 are arranged in contact with one another and substantially perpendicular to the axis of rotation of the body or drum 1 so that they have no appreciable effect upon the displaced crop. The guide members 29 and 30 can, in fact, be turned upwardly about the longitudinal axis of the tube 46 to a position in which they lie wholly or mainly above the baffle 24 in which position they are not contacted to any appreciable extent by the displaced crop. The two relatively spaced swaths A and B are thus formed into a single windrow C whose width is very approximately equal to the width of one of the two swaths A and B. The crop may advantageously be deposited on the ground in this way during wet weather since it tends to absorb less water in the form of a single windrow than in the form of two separate relatively flat swaths.

Figure 9:
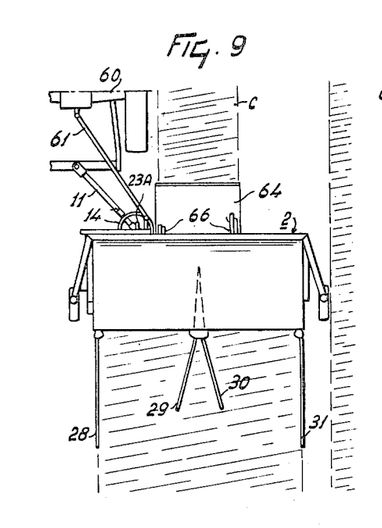
FIGURE 9 illustrates one method of operating the tedder of FIGURE 1.

If good drying conditions prevail, the windrow C can be spread over the land in the manner illusrated in Figure 9. The windrow C meets a central region of the body or drum 1 and the guide members 28 and 31 are disposed approximately perpendicular to the axis of rotation of the body or drum. Alternatively, the guide members 28 and 31 can be turned upwardly about the longitudinal axes of the tubes 36 until they are disposed wholly or partly above the baffle 24. The guide members 29 and 30, on the other hand, are arranged in divergent relationship at a level such that some, but not all, the crop is deflected thereby. In accordance with the thickness of the windrow C and the settings of the guide members 29 and 30, a substantially uniform distribution of the displaced crop throughout the width of the tined body or drum 1 is produced. If the windrow C is of a substantial height, the guide member afforded by the plate 64 may be employed in the manner illustrated in Figure 9. The windrow C is then flattened to a certain extent by the plate 64 while the ribs 72 initiate the displacement of the cut crop towards the opposite sides or ends of the body or drum 1.

It will be apparent that the two mown swaths A and B illustrated in FIGURE 1 can be directly distributed throughout the width of the body or drum 1 as shown in FIGURE 9 merely by appropriate adjustment of the guide members 28 to 31. The distribution of the displaced crop throughout the width of the body or drum 1 is initiated to a certain extent by the plates 55 and 56.

Figure 10:
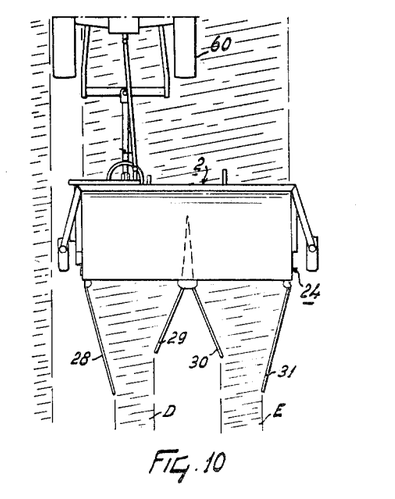
FIGURE 10 illustrates a second method of operating the tedder.

Since the atmosphere tends to become rather moist in the evenings, it is generally desirable to collect cut crop which is being dried into swaths at this time of day in order to prevent the crop being wetted beyond an unavoidable minimum extent. The tedder may be employed to achieve this by using it in the manner illustrated in FIGURE 10. The guide members 28 to 31 are all arranged at angles of other than 90° to the axis of rotation of the body or drum 1 and are also disposed at a level such that substantially all the displaced crop is deflected thereby. As can be seen in FIGURE 10, this results in the production of two relatively narrow swaths D and E.

Figure 11:
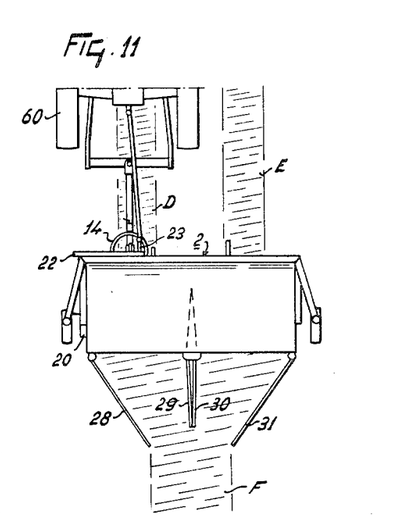
FIGURE 11 illustrates a third method of operating the tedder.

When the dried crop is to be collected, it is preferably first arranged in the form of a single large windrow F in the manner illustrated in FIGURE 11. FIGURE 11 actually shows the manner in which the tedder is used to re-distribute the two swaths D and E in the form of the single windrow F but it will be appreciated that the tedder could equally be employed to produce the windrow F from crop spread widely over the field to dry. The guide members 28 and 31 are substantially inclined towards one another while the guide members 29 and 30 are arranged in contact with one another or are turned to a position above the baffle 24 so that they do not deflect the crop to any appreciable extent.

Figure 12:
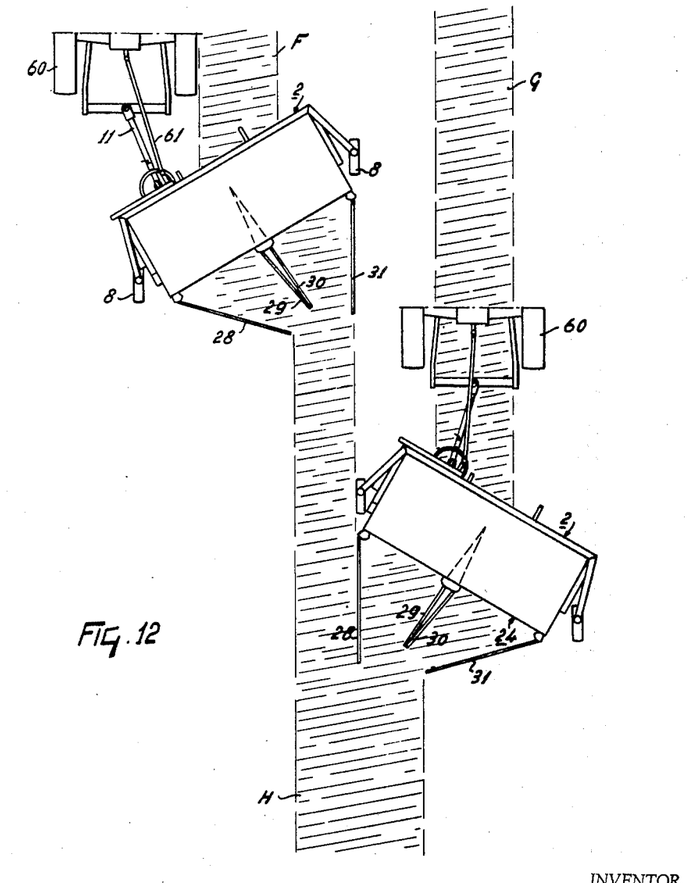
FIGURE 12 illustrates a fourth method of operating the tedder.
Figure 13:
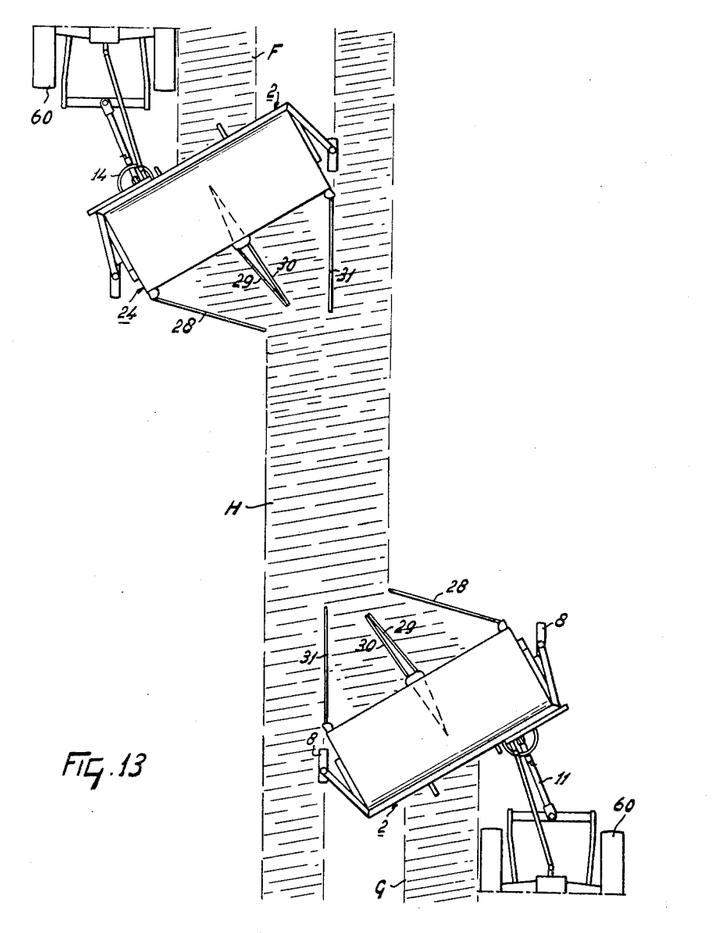
FIGURE 13 illustrates a fifth method of operating the tedder to produce the same result as the fourth method just mentioned.

The tedder may be arranged so that the axis of rotation of the tined body or drum 1 is inclined at an angle of other than 90° to the direction of travel of the tedder. This may be done by appropriate adjustment of the setting of the plane of rotation of one, or both, of the ground wheels 8. FIGURES 12 and 13 illustrate methods of using the tedder in this manner to displace two relatively small windrows F and G laterally to form a single relatively large windrow H. FIGURE 12 illustrates a method in which the tractor 60 makes successive traverses of the field in the same direction whereas FIGURE 13 illustrates a method in which the tractor 60 makes successive traverses in relatively opposite directions. It will be apparent that the result is substantially the same in both cases. The method of FIGURE 13 has the advantage that re-positioning of the tedder relative to the tractor 60 is unnecessary between successive traverses. The tedder may also be used in the manner illustrated generally in FIGURES 12 and 13 to form a single windrow to one side of the path of travel of the tractor 60.

Figure 14:
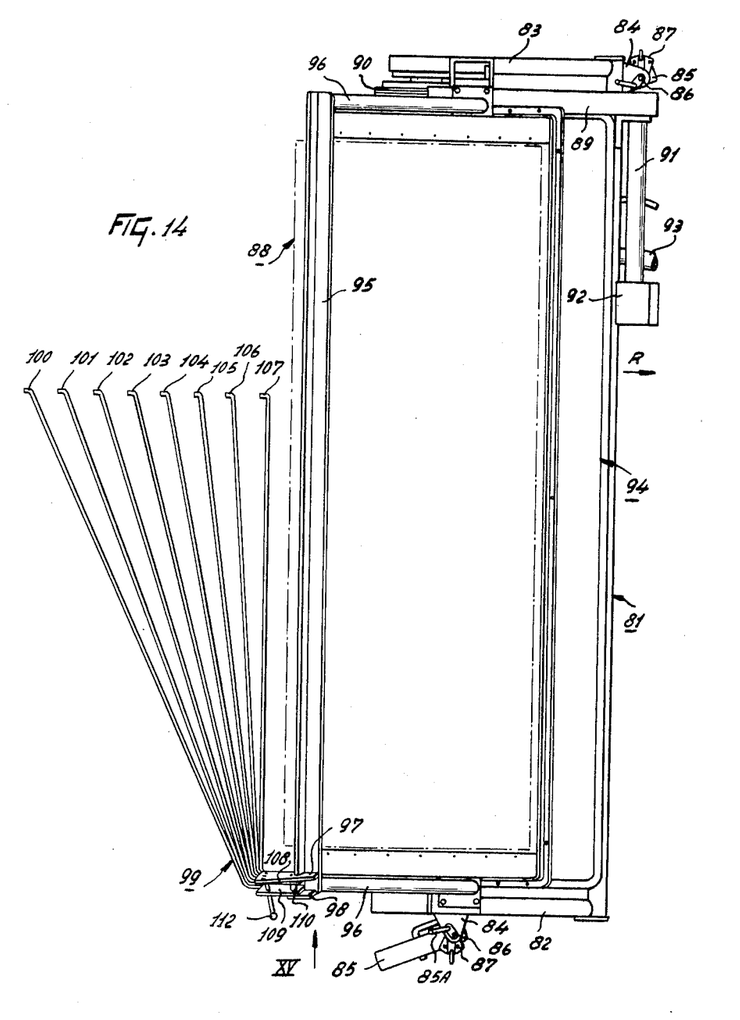
FIGURE 14 is a plan view of an implement in accordance with the invention.
Figure 15:
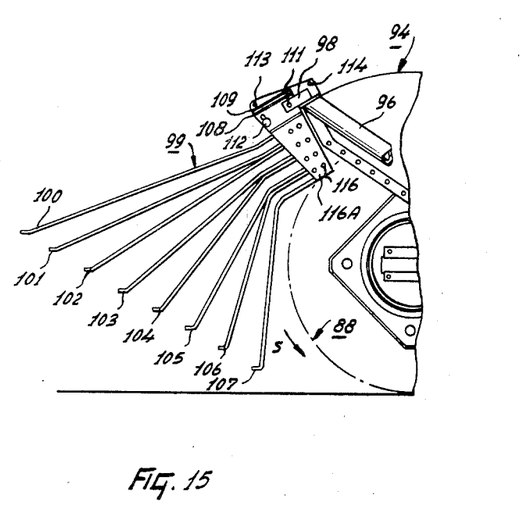
FIGURE 15 is a side elevation of part of the implement of FIGURE 14 as seen in the direction indicated by the arrow XIV of FIGURE 14.

The implement illustrated in FIGURES 14 and 15 has a main frame beam 81 to the opposite ends of which two beams 82 and 83 are secured so as to project perpendicularly. A bracket 84 is secured to the frame beam 82 adjacent the free end thereof and a further bracket 84 is secured to the frame beam 81 adjacent its junction with the frame beam 83. Vertical shafts 86 are journalled in the brackets 84 and the lowermost ends of these shafts are bent to form horizontal axles upon which ground wheels 85 are rotably mounted. The longitudinal axes of the axles of the wheels 85 do not intersect the longitudinal axes of the shafts 86 so that the said ground wheels are castor wheels. Means including screw-threaded cranked spindles 85A are provided whereby the levels of the axles of the ground wheels 85 can be changed relative to the frame of the implement and thus the level of the frame of the implement relative to the ground. In addition, locking means generally indicated by the reference numeral 87 are provided by which the planes of rotation of the two ground wheels 85 can be retained in selected angular settings about the vertical axes afforded by the shafts 86.

A crop-working member afforded by a tined body or drum 88 is journalled in the frame so as to be rotatable about a substantially horizontal axis extending substantially parallel to the frame beam 81. In the embodiment illustrated, the effective diameter of the body or drum 88 is about 100 centimeters while its effective width in a direction parallel to its own axis of rotation is about 300 centimeters. The body or drum 88 is, in fact, rotatably supported in bearings carried by the frame beams 82 and 83, the arrangement of these bearings not being illustrated in detail in the drawings. One end of the body or drum 88 has a pulley 90 secured to it around which an endless belt, rope or the like is passed. The belt, rope or the like extends within a casing 89 secured to the frame and also passes around a further pulley secured to one end of a shaft extending axially of a cylindrical casing 91 connected to the main frame beam 81. The end of said shaft remote from the casing 89 is disposed within a gear casing 92 and carries a pinion whose teeth are in mesh with those of a further pinion mounted on a shaft (not shown) whose splined or otherwise keyed end projects forwardly of the implement from the gear casing 92. A drawbar 93 projects forwardly of the implement and is connected to the frame beam 81 in such a way that it can be retained in selected angular settings relative to that frame beam. The leading end of the draw-bar 93 is, of course, provided with means whereby it can be connected to a tractor or other propelling vehicle.

The implement includes a hood or baffle 94 which surrounds a portion of the body or drum 88 and which extends from the level of the frame beam 81 upwardly and rearwardly over the said body or drum 88. A bar 95 of L-shaped crosssection is secured to the rearmost upper edge of the baffle 94 and the uppermost ends of two tubes 96 are rigidly secured to the opposite ends of this bar. The lower ends of the tubes 96 are rigidly connected to the frame of the implement.

Two plates 97 and 98 are secured to one end of the bar 95, the plate 97 being substantially larger than the plate 98. A guide member, generally indicated by the reference numeral 99, for crop displacement by the implement is mounted so as to be adjustable in position relative to the plates 97 and 98. The guide member 99 is comprised principally by eight spring steel guide rods 100, 101, 102, 103, 104, 105, 106 and 107. The ends of such rods are clamped to a supporting plate 109 by means of a clamping plate 116A and a plurality of bolts 116. A second supporting plate 108 is parallel to, but spaced from, the supporting plate 108, a sleeve 110 accommodating a shaft 111 extending perpendicularly between these plates. The shaft 111 affords an axis about which the guide member 99 is turnable relative to the frame of the implement and its opposite ends are journalled in holes formed in the plates 97 and 98, respectively. The shaft 111 is, in fact, located in a vertical plane extending parallel to the axis of rotation of the tined body or drum 88 and is inclined to the horizontal at an angle of about 20°, the uppermost end of the shaft being disposed towards the center of the implement.

The supporting plates 108 and 109 are formed with aligned holes through which a spring-loaded locking pin 112 is entered. A portion of the plate 97 which projects rearwardly of the baffle 94 is formed with a number of holes 113 arranged equidistant from the shaft 111. The tip of the locking pin 112 can enter a chosen one of the holes 113 to retain the supporting plates 108 and 109 together with the guide member 99 in a corresponding angular setting about the axis afforded by the shaft 111. An additional hole 114 is formed in the plate 97 immediately above the rearmost edge of the baffle 94 and, by turning the supporting plates 108 and 109 together with the guide member 99 through approximately 180° about the shaft 111, the tip of the locking pin 112 can be entered through the hole 114. The guide rods 100 to 107 will then occupy an inoperative position in which they are disposed over and above the baffle 94.

The guide rods 100, 101, 102, 103, 104, 105, 106 and 107 are formed in integral pairs from single lengths of spring steel rod, the approximately 180° bends interconnecting the two rods of a pair being sandwiched between the clamping plate 116A and the supporting plate 108. It can be seen from FIGURE 14 that, in plan view, the lowermost guide rods 107 extends approximately parallel to the axis of rotation of the tined body or drum 88 over a distance which is equal to approximately two-thirds of the width of said body. The uppermost guide rod 100 is, on the other hand, inclined in plan view at an angle of about 25° to the axis of rotation of the body or drum 88. The six intermediate guide rods 101, 102, 103, 104, 105 and 106 are inclined to the axis of rotation at progressively increasing angles commencing with the lowermost rod and ending with the uppermost rod. It will also be apparent from FIGURE 14 that the guide rods 100, 101, 102, 103, 104, 105, 106 and 107 are arranged in such a way that their free ends or tips are spaced apart from one another by substantially equal distances.

When seen in side elevation (FIGURE 15), the guide rods 100, 101, 102, 103, 104, 105, 106 and 107 project parallel to one another over a short distance from the supporting plates 108 and 109. The third guide rod from the top 102 is straight throughout its length while the uppermost and second guide rods 100 and 101 are bent upwardly from the ends of the parallel portions, the rod 100 being bent upwardly through a greater angle than the rod 101. The five rods 103, 104, 105, 106 and 107 located below the rod 102 are all bent over downwardly from the ends of the said parallel portions, the angles by which said rods are bent over progressively increasing from the rod 103 to the rod 107. As can be seen in FIGURES 14 and 15, the extreme tips of all the rods 100, 101, 102, 103, 104, 105, 106 and 107 are bent over in such a way that they all lie in a plane extending perpendicular to the axis of rotation of the tined body or drum 88.

In the use of the implement, the draw-bar 93 is connected to a tractor or other propelling vehicle and the implement is drawn over the ground in the direction indicated by the arrow R in FIGURE 14. The shaft (not shown) projecting forwardly from the gear casing 92 is connected to the power take-off shaft of the tractor or other vehicle by an intermediate transmission shaft and the tined body or drum 88 is rotated in the direction indicated by the arrow S in FIGURE 15 so that the tines thereof move over the ground surface in the direction R. Crop engaged by the tines is thus moved upwardly in front of the body or drum 88 and rearwardly over the top thereof beneath the baffle 94. A large proportion of the displaced crop comes into contact with the guide rods 100 to 107 of the guide member 99, the said crop being displaced laterally as a result. The displaced crop is formed into a swath which is deposited on a strip of ground disposed towards the side of the implement remote from the guide member. The width of said swath is substantially less than the width of the tined body or drum 88.

Figure 16:
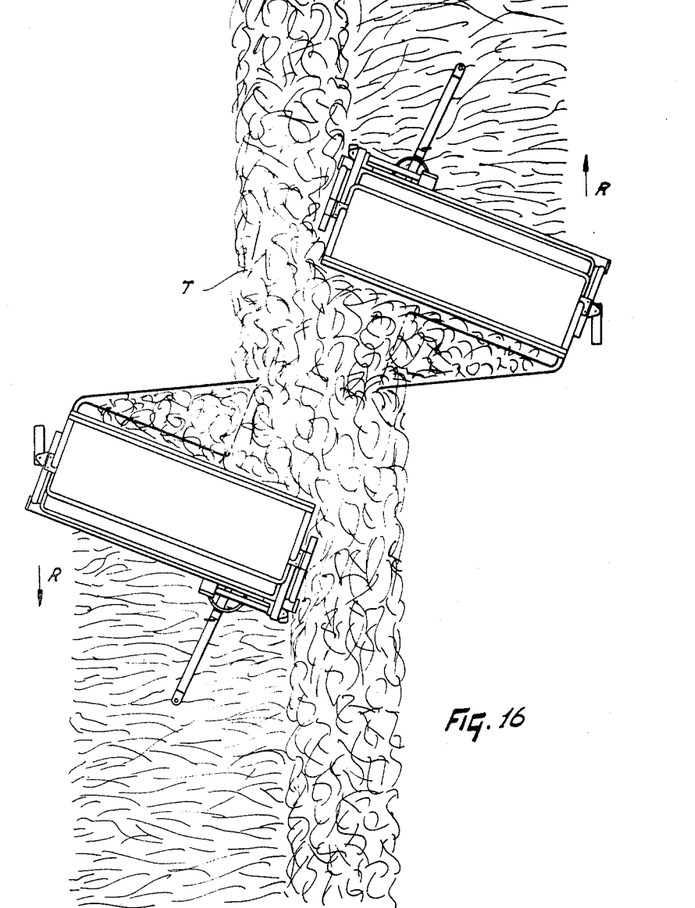
FIGURE 16 illustrates a method of using the implement of FIGURES 14 and 15.

As can be seen in FIGURE 16, the planes of rotation of the ground wheels 85 are preferably set in such a way that the axis of rotation of the tined body or drum 88 makes an angle of about 70° with the direction R. Since the ground wheel 85 located adjacent the junction between the frame beams 81 and 83 is disposed in front of the body or drum 88 relative to the direction R, this ground wheel does not tend to run over worked crop at least when the implement is disposed as just mentioned and as illustrated in FIGURE 16. It will be apparent from FIGURE 16 that the swath formed during one traverse of the implement can be joined by a second similar swath which is formed by the implement during the next traverse of the land in a relatively opposite direction to the first traverse. Thus, the two swaths form a single relatively large swath T.

In order that crop shall be laterally displaced to an effective extent during use of the implement, it is desirable that the rods of the guide member 99 should extend over not less than about half the width of the tined body or drum 88. It will be apparent that the guide member 99 may, if desired, be afforded by a profiled plate rather than by the eight guide rods 100, 101, 102, 103, 104, 105, 106 and 107 which have been described.

Figure 17:
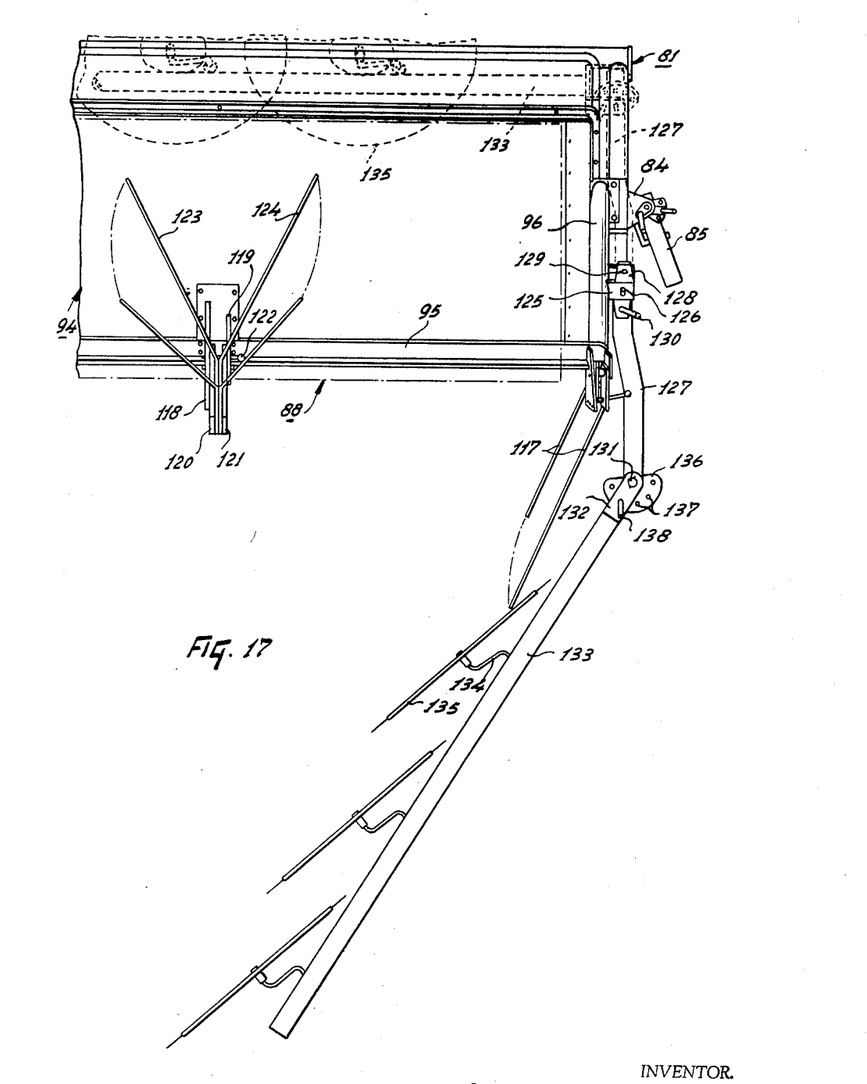
FIGURE 17 is a plan view of an alternative embodiment of an implement in accordance with the invention.

The implement which is illustrated in FIGURE 17 is basically similar to the implement which has already been described and, accordingly, those parts which are the same as, or similar to, parts which have already been described are designated by the same reference numerals as have previously been employed. The relatively long guide rods 100, 101, 102, 103, 104, 105, 106 and 107 are replaced by a plurality of relatively short guide rods 117 each of which, in plane view, makes an angle of about 70° with the axis of rotation of the tined body or drum 88. The length of each of the guide rods 117 is, in fact, approximately equal to the diameter of the tined body or drum 88. Two plates 118 and 119 are arranged approximately centrally of the rearmost edge of the baffle 94, two supporting plates 120 and 121 being turnable between the plates 118 and 119 about a shaft (not visible) affording an axis extending parallel to the axis of rotation of the body or drum 88. A spring-loaded horizontal locking pin 122 can be entered through chosen registering holes in the plates to retain guide members carried by the supporting plates 120 and 121 in selected angular settings about the axis just mentioned. The guide members are afforded by two groups of spring steel guide rods 123 and 124 respectively, the ends of these rods being clamped between the supporting plates 120 and 121 by means of bolts (not illustrated). FIGURE 17 shows the guide members afforded by the rods 123 and 124 in inoperative positions in which they are retained over and above the baffle 94. It will be realized that crop displaced by the body or drum 88 does not contact the guide rods 123 and 124 when they occupy this position.

One of the tubes 96 carries two supports 125 in which supports a shaft 126 is journalled. The shaft 126 is contained in a plane disposed perpendicular to the axis of rotation of the body or drum 88 and extends obliquely upwardly towards the rear of the implement. One end of a beam 127 is turnable about the shaft 126 relative to the tube 96 and can be retained in either the position shown in full lines or that shown in broken lines in FIGURE 17 by entering a locking pin 130 through a hole formed in the beam 127 and either one of two holes 129 formed in lugs 128 projecting from relatively opposite sides of the uppermost support. In the position shown in full lines, the beam 127 projects rearwardly of the implement substantially perpendicular to the axis of rotation of the body or drum 88 whereas, in the position shown in broken lines, it is rotated through 180° about the shaft 126.

The end of the beam 127 remote from the shaft 126 supports an approximately vertical pivot pin 131 about which a forked bracket 132 carried at one end of a beam 133 is turnable. The end of the beam 127 also carries a sector plate 136 in which a number of holes 137 are formed at equal distances from the pivot pin 131. A locking pin 138 can be entered through holes formed in the forked bracket 132 and through a chosen one of the holes 137 to retain the beam 133 in a corresponding angular setting relative to the beam 127. Three cranks 134 are turnable in bearings carried by the beam 133 and the ends thereof remote from said bearings have three rake wheels 135 rotatably mounted upon them. As can be seen in FIGURE 17, the three rake wheels 135 extend in overlapping relationship. If desired, springs or the like may be associated with the cranks 134 in such a way that the rake wheels 135 are resiliently supported from the beam 133. It can be seen that the guide member afforded by the rods 117 terminates in front of the leading rake wheel 135 so that, considered in a substantially horizontal direction at right-angles to the axis of rotation of the body or drum 88, the guide member which is afforded by the rods 117 and by the three rake wheels 135 extends across approximately half the width of the body or drum 88.

The implement can be connected to a tractor or other propelling vehicle in such a way as to be moved over the ground thereby and in such a way as to have the body or drum 88 rotated by the power take-off shaft thereof. The rake wheels 135 are also rotated by virtue of the contact of lowermost regions of their peripheries with the ground surface or with crop lying thereon or with both. Some of the crop displaced by the tines of the body or drum 88 meets the guide member afforded by the rods 117 and is deflected laterally into the path of the foremost rake wheel 135. The three rake wheels 135 act in unison in the manner of a side-delivery rake to displace the crop just mentioned and also further crop which falls into the path of the other rake wheels 135 laterally to form a single swath to the left of the rearmost rake wheel 135 of the three. The width of this swath is substantially less than the width of the tined body or drum 88. It will be apparent that the implement may be used in substantially the same manner as illustrated in FIGURE 16 to form a single relatively large swath from the crop displaced during two successive traverses of a field.

By bringing the beam 133 to an appropriate setting about the pivot pin 131 and also the beam 127 to the correct setting about the shaft 126, the beam 133 can be retained in the position illustrated in broken lines in FIGURE 17. In this position, it extends along the front of the implement parallel to the frame beam 81 while the rake wheels 135 which are carried thereby lie above the frame beam 81 and the front of the baffle 94. The oblique mounting of the shaft 126 is such that, when the beam 133 occupies the position shown in broken lines, the rake wheels 135 are located well clear of the ground. When the beam 133 is disposed in this way, the implement may be transported from one place to another or may be used to work crop in a different manner to that which has previously been described.

The implement may be employed to form crop into two relatively small swaths. The beam 133 is placed in its inoperative position and the guide members afforded by the guide rods 117, 123 and 124 are all brought to operative positions. In addition, a guide member symmetrical with the guide member afforded by the rods 117 and located at the opposite end of the body or drum 88 is also brought to an operative position. The four guide members act together to form the crop displaced by the body or drum 88 into two relatively small swaths whose total width is less than the width of the body or drum 88. The implement may also be used to distribute crop substantially uniformly over a field at which time the rake wheels 135 and all the four guide members are placed in their inoperative positions. The four guide members connected to the baffle 94 are also preferably retained in their inoperative positions at times when the implement is transported from one place to another without performing any working operation.

It will be clear that the working method shown in FIGURE 12 can also be performed with two tedders which an oppositely inclined relative to the direction of travel. In this way is obtained a working arrangement of two tedders, whereby a relatively large swath can be formed in a simple way.

What is claimed is:

1. A tedder of the kind comprising a rotatable body having tines thereon in spaced relationship for picking up the crop from the ground, a frame on which said body is rotatably mounted so as to rotate in such a direction that the tines in the lowermost region of the tined body move forwardly relative to the intended direction of travel of the tedder, a hood partially surrounding said tined body, guide means associated with said tined body mounted at the rear of the tedder, said guide means forming deflector surfaces for the crop displaced by said tined body, support means for pivotally mounting said guide means on said tedder, said support means and guide means being pivotable in a substantially horizontal direction and in a substantially vertical direction, locking means on said tedder, said locking means being associated with support means to retain said guide means in selected angular settings.

2. The tedder of claim 1 wherein said support means and guide means are pivotably mounted adjacent said hood.

3. The tedder of claim 1 wherein the interior surface of the hood is a concave surface having two plates projecting downwardly towards the tined body, said plates being arranged to diverge towards the rear of the implement.

4. The tedder of claim 3 wherein the plates are provided with bent-over lower edges which are connected by a strengthening plate.

5. The tedder of claim 1 wherein said guide means include guide members, said guide members being pivotally adjustable singularly.

6. The tedder of claim 1 wherein said guide means include guide members, said guide members being pivotally adjustable in a group.

7. The tedder of claim 1 wherein said guide means include guide members, a pair of guide members being disposed centrally of the tined body and an independent guide member being disposed at each end of the body.

8. The tedder of claim 7 wherein the end guide members are longer than the centrally disposed guide members.

9. The tedder of claim 7 wherein the centrally disposed guide members have free ends that are arranged in close proximity to each other.

10. The tedder of claim 8 wherein the centrally disposed guide members have free ends that are arranged in close proximity to each other.

11. The tedder as claimed in claim 7 wherein the centrally disposed guide members are pivotally adjustable together about a substantially horizontal axis and pivotally adjustable independently of one another about axes inclined to the horizontal.

12. The tedder as claimed in claim 2 wherein the interior surface of the hood is a concave surface having two plates projecting downwardly towards the tined body, said plates being arranged to diverge towards the rear of the implement.

13. The tedder as claimed in claim 1 wherein the guide means include a plurality of guide rods.

14. The tedder as claimed in claim 13 wherein each guide rod is progressively inclined to the horizontal at a greater angle than the preceding guide rod of the same member.

15. The tedder of claim 14 wherein the guide rods are bent and extend in a direction towards the tined body.

16. The tedder of claim 14 wherein the guide rods of the end guide members are contained in planes inclined to the vertical and the guide rods of the centrally disposed guide members are contained in substantially vertical planes.

References Cited by the Examiner

UNITED STATES PATENTS

| | | | |
|---|---|---|---|
| 498,205 | 5/1893 | Burdin | 56—192 |
| 2,620,611 | 12/1952 | Russell | 56—1 |
| 2,636,335 | 4/1953 | Whitney | 56—370 |
| 2,747,354 | 5/1956 | Bloser | 56—192 XR |
| 2,751,745 | 6/1956 | Magee | 56—192 XR |
| 2,810,253 | 10/1957 | Moore | 56—372 |
| 2,926,476 | 3/1960 | Van der Lely et al. | 56—1 |
| 3,059,403 | 10/1962 | Bamford et al. | 56—366 |
| 3,084,497 | 4/1963 | Reilly | 56—370 |

FOREIGN PATENTS 86,403  10/1958  Denmark.

ANTONIO F. GUIDA, *Acting Primary Examiner.*

RUSSELL R. KINSEY, T. GRAHAM CRAVER, *Examiners.*